(12) United States Patent
Tsai et al.

(10) Patent No.: US 11,088,723 B2
(45) Date of Patent: Aug. 10, 2021

(54) ELECTRONIC DEVICE AND NEAR FIELD COMMUNICATION ANTENNA THEREOF

(71) Applicant: ASUSTeK COMPUTER INC., Taipei (TW)

(72) Inventors: Chien-Hung Tsai, Taipei (TW); Kuo-Chu Liao, Taipei (TW); Wei-Cheng Lo, Taipei (TW); Te-Li Lien, Taipei (TW); Ming-Shan Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/732,683

(22) Filed: Jan. 2, 2020

(65) Prior Publication Data

US 2020/0235783 A1    Jul. 23, 2020

(30) Foreign Application Priority Data

Jan. 18, 2019    (TW) .................. 108102093

(51) Int. Cl.
| | |
|---|---|
| *H04B 5/00* | (2006.01) |
| *H01Q 1/44* | (2006.01) |
| *H04W 4/80* | (2018.01) |
| *H04M 1/02* | (2006.01) |
| *H01Q 1/22* | (2006.01) |

(52) U.S. Cl.
CPC ............ *H04B 5/0025* (2013.01); *H01Q 1/22* (2013.01); *H01Q 1/44* (2013.01); *H04M 1/0264* (2013.01); *H04W 4/80* (2018.02); *H04M 2250/04* (2013.01)

(58) Field of Classification Search
CPC .......... H04B 5/0025; H01Q 1/44; H01Q 1/22; H04W 4/80; H04M 1/0264; H04M 2250/04
See application file for complete search history.

(56) References Cited

U.S. PATENT DOCUMENTS

| | | | |
|---|---|---|---|
| 9,298,226 B2* | 3/2016 | Nakano | ............... H04B 5/0031 |
| 2015/0009077 A1 | 1/2015 | Jang et al. | |
| 2016/0112219 A1 | 4/2016 | Lee et al. | |
| 2017/0077597 A1 | 3/2017 | Gong et al. | |
| 2018/0151943 A1* | 5/2018 | Lee | ..................... H05K 5/0017 |

FOREIGN PATENT DOCUMENTS

| | | |
|---|---|---|
| CN | 105261822 A | 1/2016 |
| CN | 106887708 A | 6/2017 |
| CN | 206389417 U | 8/2017 |
| CN | 208045684 U | 11/2018 |

* cited by examiner

*Primary Examiner* — Lester G Kincaid
*Assistant Examiner* — Maryam Soltanzadeh
(74) *Attorney, Agent, or Firm* — McClure, Qualey & Rodack, LLP

(57) ABSTRACT

An electronic device is disclosed. The electronic device includes a conductive plate, an opening, two feeding parts, and an electronic assembly. The opening is disposed at a side of the conductive plate. The opening has a first side and a second side opposite to each other, and the first side and the second side are connected with the side of the conductive plate. The electronic assembly is located in the opening. Two feeding parts are respectively disposed on the first side and the second side of the opening. the feeding parts is used to receive a feeding signal, and the feeding signal is transmitted along the first side of the opening to the second side of the opening and generates a near field magnetic field.

10 Claims, 7 Drawing Sheets

ELECTRONIC DEVICE AND NEAR FIELD COMMUNICATION ANTENNA THEREOF

CROSS-REFERENCE TO RELATED APPLICATION

This application claims the priority benefit of Taiwan application serial No. 108102093, filed on Jan. 18, 2019. The entirety of the above-mentioned patent application is hereby incorporated by reference herein and made a part of the specification.

BACKGROUND OF THE INVENTION

Field of the Invention

The invention relates to an antenna technology and, more particularly, to an electronic device and near field communication antenna thereof.

Description of the Related Art

With the advancement and development of technology, the electronic device has become increasingly popular. In order to meet the needs of the public, in addition to the traditional WIFI, Bluetooth and other wireless communication protocols, Near Field Communication (NFC) technology has gradually become a communication technology that can be practically used on the electronic device.

However, due to the complication of functions of the electronic device, the electronic device now requires more components to be placed in a volume-constrained design. When the near field communication antenna is placed in the electronic device, it compresses the space of other components in the electronic device, or it increases the volume of the electronic device. As a result, setting the near field communication antenna adds a lot of extra burden to the electronic device, which needs to be light and thin.

BRIEF SUMMARY OF THE INVENTION

According to the first aspect of the disclosure, an electronic device is provided. The electronic device includes: a conductive plate; an opening, disposed at a side of the conductive plate and having a first side and a second side opposite to each other, wherein the first side and the second side are connected with the side of the conductive plate; two feeding parts, respectively disposed on the first side and the second side of the opening, to receive a feeding signal, wherein the feeding signal is transmitted along the first side of the opening to the second side of the opening and generates a near field magnetic field; and an electronic assembly, located in the opening.

According to the second aspect of the disclosure, a near field communication antenna is provided. The near field communication antenna includes: a conductive plate; an opening, disposed at a side of the conductive plate, the opening having a first side and a second side opposite to each other, wherein the first side and the second side are connected with the side of the conductive plate; two feeding parts, respectively disposed on the first side and the second side of the opening, to receive a feeding signal, wherein the feeding signal is transmitted along the first side of the opening to the second side of the opening and generates a near field magnetic field.

In summary, the function of near field communication is achieved through the opening of the conductive plate 100 of the electronic device in the disclosure. Since the conductive plate in the electronic device includes the opening that configured to set the electronic assembly. By setting the two feeding parts on the first side and the second side of the opening, and the opening only overlaps the electronic assembly with a small area of conductive structure on the normal line, the near field communication function is achieved without occupying extra internal space of the electronic device, thereby solving the problem that the conventional large-size antenna is too large. In some embodiments, the electronic device of the disclosure is connected to another antenna with near field communication function to enhance the strength of the near field magnetic field.

These and other features, aspects and advantages of the present invention will become better understood with regard to the following description, appended claims, and accompanying drawings.

DETAILED DESCRIPTION OF THE EMBODIMENTS

The disclosure is related to a near field communication antenna. Although several preferred modes are described in the specification to be considered as the implementation of the present disclosure, it should be understood that the present disclosure can be implemented in many ways and should not be limited to the embodiments or the specifics description of implementing the following features below. In other instances, well-known details will not be described or discussed in order to avoid obscuring the present disclosure.

The word "coupling" and its derivatives may be used in this disclosure. In some embodiments, "coupled" is used to mean that two or more elements are in direct physically or electrically contact with each other, or may also mean that two or more elements are indirectly in electrically contact with each other. The term "coupled" can still be used to mean that two or more elements cooperate or interact with each other.

Figure 1:
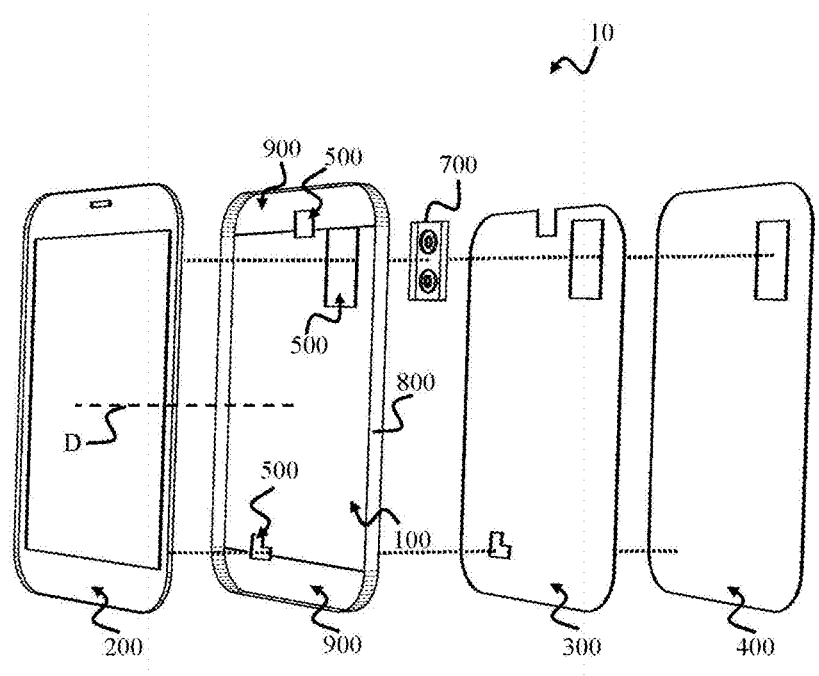
FIG. 1 is a schematic diagram of an electronic device according to some embodiments of the present invention.

Referring to FIG. 1, in some embodiments, the electronic device 10 is, for example but not limited to, a cell phone, a tablet PC, a notebook, or any device having a near field communication function. In an embodiment, a mobile phone is taken as an example for explanation.

Figure 2:
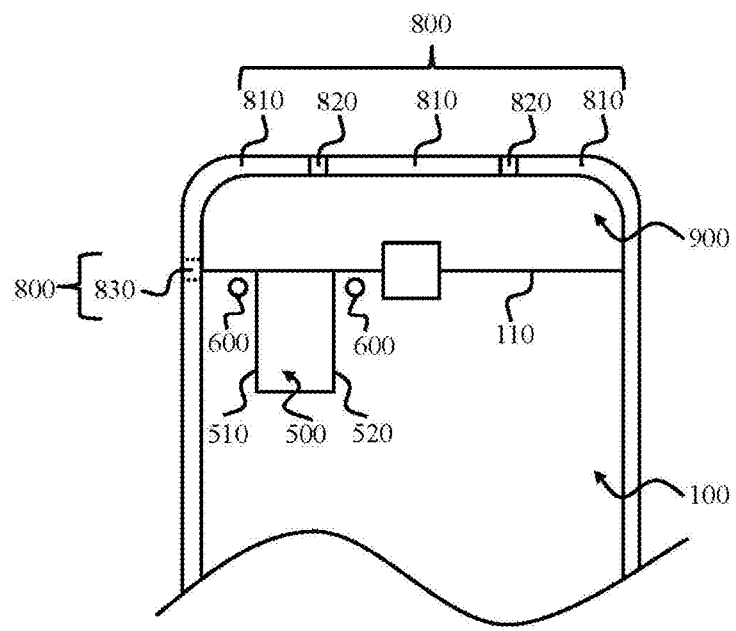
FIG. 2 is a partial schematic view of a conductive plate of according to some embodiments of the present invention.

Please refer to FIG. 1 and FIG. 2 together, in some embodiments, the electronic device 10 includes a conductive plate 100, an opening 500, two feeding parts 600, an electronic assembly 700, a panel 200, an insulated backplane 400, and a printed circuit board 300. The electronic assembly 700 is located in the opening 500, the opening 500 is disposed on a side 110 of the conductive plate 100, and the opening 500 has a first side 510 and a second side 520 opposite to each other. The first side 510 and the second side 520 are connected to the side 110 of the conductive plate. Two feeding parts 600 are respectively disposed on the first side 510 and the second side 520. The conductive plate 100 has a normal line D, the panel 200, the printed circuit board 300 and the insulated backplane 400 are respectively located on the normal line D of the conductive plate 100, and the conductive plate 100 is located between the panel 200 and the insulated backplane 400. In some embodiments, one of the feeding parts 600 is located at the junction of the first side 510 of the opening 500 and the outer edge of the conductive plate 100, and adjacent to the first side 510 but not contact with the outer edge of the conductive plate 100 and the first side 510. And the other one of the feeding parts 600 is located at the junction of the second side 520 of the opening 500 and the outer edge of the conductive plate 100, and adjacent to the first side 510 but not contact with the outer edge of the conductive plate 100 and the second side 520. In some embodiments, the printed circuit board 300 is located between the conductive plate 100 and the insulated backplane 400. According to some embodiments, the conductive plate 100 and the two feeding parts 600 are made of a conductive material, such as but not limited to: copper, silver, iron, aluminum or alloys thereof.

In some embodiments, the electronic device 10 uses the panel 200 and the insulated backplane 400 as the upper and lower covers of the electronic device 10, respectively, as the front and rear support structures of the electronic device 10. The conductive plate 100 is used as a support structure between the panel 200 and the insulated backplane 400, that is, the conductive plate 100 is the internal skeleton of the electronic device 10. According to some embodiments, the printed circuit board 300 is connected to the conductive plate 100 to be fixed in the electronic device 10.

Figure 3:
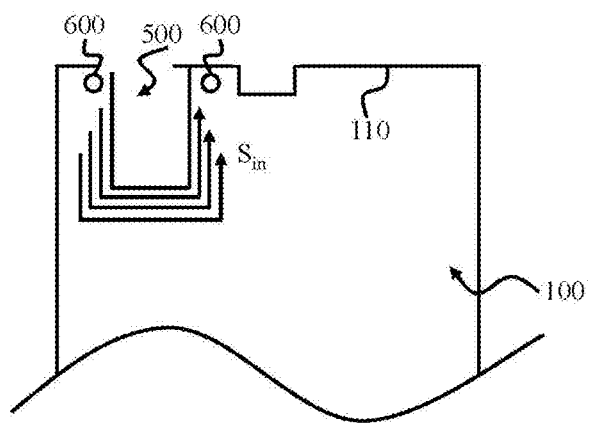
FIG. 3 is a schematic diagram of a feeding signal according to some embodiments of the present invention.
Figure 4:
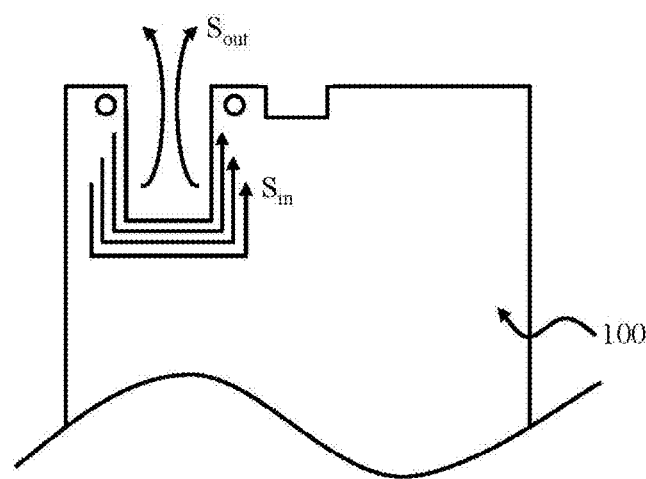
FIG. 4 is a schematic diagram of a near field magnetic field according to some embodiments of the present invention.

Please refer to FIG. 2, FIG. 3 and FIG. 4. In some embodiments, the two feeding parts 600 are configured to receive a feeding signal $S_{in}$. The conductive plate 100 is regarded as a signal transmission medium to transmit the feeding signal $S_{in}$ along the first side 510 of the opening 500 to the second side 520 of the opening 500 and generates a near field magnetic field $S_{out}$. Specifically, when the feeding signal $S_{in}$ is transmitted in the conductive plate 100, the feeding signal $S_{in}$ is unevenly distributed in the conductive plate 100 due to the effect of the skin effect. Therefore, the feeding signal $S_{in}$ mainly flows along the edge of the opening 500, and the feeding signal $S_{in}$ flowing along the edge of the opening 500 generates an unclosed loop circuit in the conductive plate 100. A near field magnetic field $S_{out}$ is generated when the feeding signal $S_{in}$ flows through the unclosed loop circuit, so the unclosed loop circuit at the edge of the opening 500 is regarded as a first antenna.

Please continue referring to FIG. 2. In some embodiments, the electronic device 10 further includes a conductive frame 800 and an insulation plate 900. The conductive frame 800 is connected to the conductive plate 100, and the insulation plate 900 is connected to the conductive frame 800 and the conductive plate 100. It should be noted that the insulation plate 900 is connected to the side 110 with the opening 500. In some embodiments, the conductive plate 100 can be extended to be the visible conductive frame 800 of the electronic device 10, and after the electronic device 10 is assembled, the conductive plate 100 is located inside the electronic device 10 (appearance invisible). In some embodiments, the conductive frame 800 is used to set up an antenna such as 3G, 4G, Wi-Fi, Global Navigation Satellite System (GNSS) to serve as a multi-frequency antenna 810 of the electronic device 10 (i.e., a multi-segment antenna). And the insulation plate 900 is used as the radiation area of the multi-frequency antenna 810.

The conductive frame 800 includes at least one multi-frequency antenna 810, at least one insulation point 820, and at least one grounding point 830. In an embodiment, the insulation point 820 insulates electrical connections between different multi-frequency antennas 810, and the insulation point 820 also insulates electrical connections between the multi-frequency antenna 810 and other conductive portions of the conductive frame 800, therefore the multi-frequency antenna 810 operates independently. The grounding point 830 is coupled to the conductive plate 100, and the multi-frequency antenna 810 is regarding the grounding point 830 as a grounded area. In some embodiments, the insulation plate 900 is made of, for example but not limited to, a non-metallic material or a non-conductive material.

Figure 5:
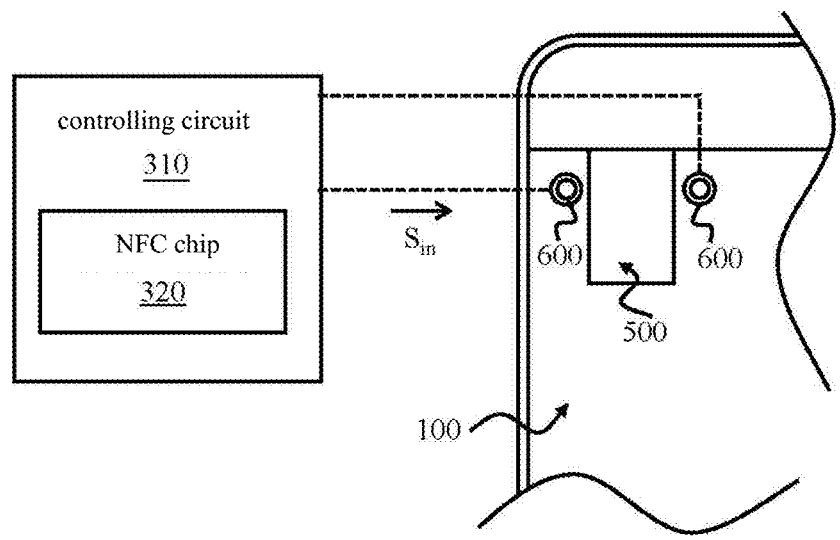
FIG. 5 is a schematic diagram of a controlling circuit according to some embodiments of the present invention.

Refer to FIG. 5, in some embodiments, the electronic device 10 further includes a controlling circuit 310. The controlling circuit 310 is coupled to the two feeding parts 600. In an embodiment, the controlling circuit 310 outputs the feeding signal $S_{in}$ to the feeding part 600. In some embodiments, the controlling circuit 310 includes a near field communication chip 320, the near field communication chip 320 controls the near field magnetic field $S_{out}$ by adjusting the feeding signal $S_{in}$. In some embodiments, the controlling circuit 310 is disposed on the printed circuit board 300 inside the electronic device 10.

Figure 6:
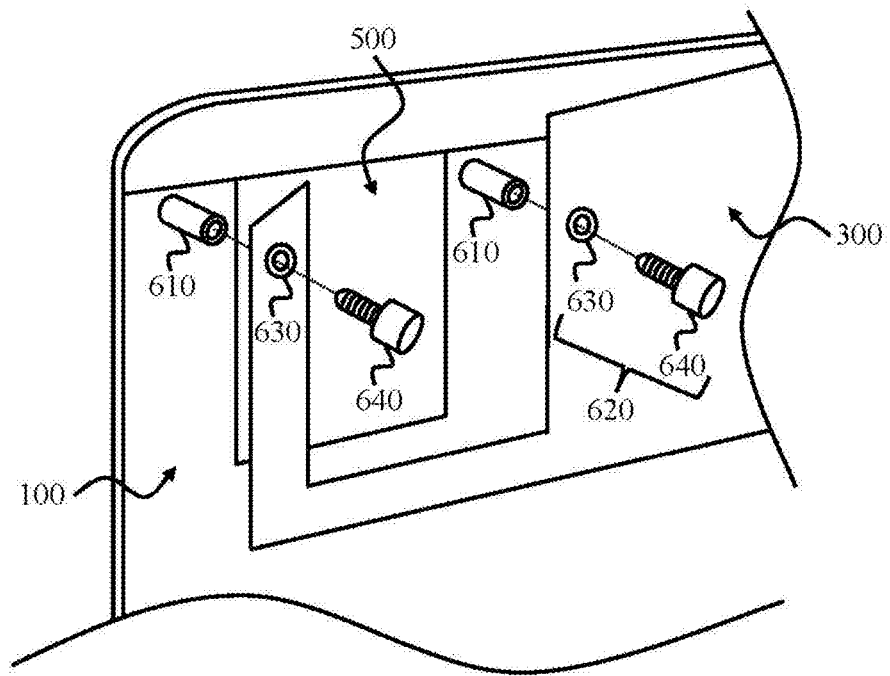
FIG. 6 is a schematic diagram of a fixing element according to some embodiments of the present invention.

Please refer to FIG. 5 and FIG. 6, in some embodiments, each of the feeding parts 600 is a fixing slot 610. The controlling circuit 310 is connected to the two fixing slots 610 via two fixing elements 620, that is, each fixing element 620 corresponds to one fixing slot 610. When the feeding signal $S_{in}$ is output from the controlling circuit 310, the feeding signal $S_{in}$ is transmitted to the fixing slots 610 via the fixing elements 620, and then transmitted to the conductive plate 100 via the fixing slots 610. In some embodiments, the fixing elements 620 are inserted into the fixing slots 610. In some embodiments, each fixing element 620 includes a fixing ring 630 and a fixing component 640. The fixing ring 630 is disposed on the printed circuit board 300. The fixing component 640 has a thread and the fixing slot 610 also has a thread matching the fixing component 640. The fixing component 640 fixes the fixing ring 630 to the fixing slot 610. In some embodiments, the fixing slot 610 is a screw post.

Figure 7:
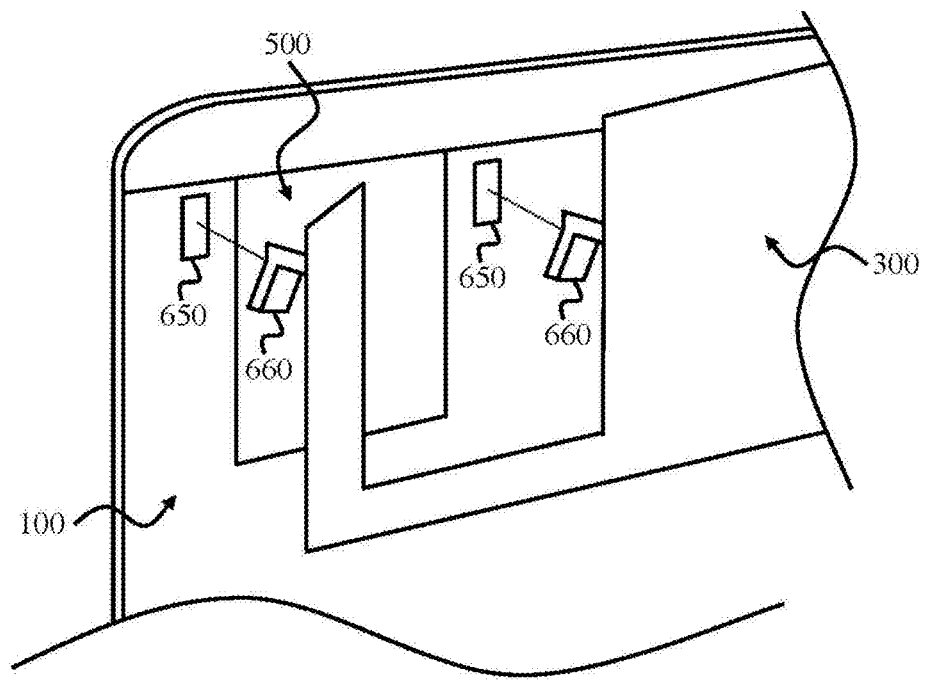
FIG. 7 is a schematic view of a fixing element according to other embodiments of the present invention.

Please refer to FIG. 5 and FIG. 7, in some embodiments, each of the feeding parts 600 is a conductive contact 650, and the controlling circuit 310 is connected to the two conductive contacts 650 through two elastic plates 660, that is, each elastic plate 660 corresponds to one conductive contact 650. When the feeding signal $S_{in}$ is output from the controlling circuit 310, the feeding signal $S_{in}$ is transmitted to the conductive contacts 650 via the elastic plates 660, and then transmitted to the conductive plate 100 via the conductive contacts 650. The shape of the elastic plate 660 is, for example but not limited to, planar, micro convex or micro concave. In some embodiments, the elastic plates 660 are disposed on the printed circuit board 300. In an embodiment, since the surface of the conductive plate 100 is processed to form a thicker and denser oxide layer by an anodizing treatment or an anti-oxidation treatment, to increase surface insulation, oxidation resistance and corrosion resistance. However, the surface conductivity of the conductive plate 100 worsens. Therefore, the conductive plate 100 manufactures the conductive contact 650 through the laser engraving technology to improve the conductivity of the conductive contact 650.

Figure 8:
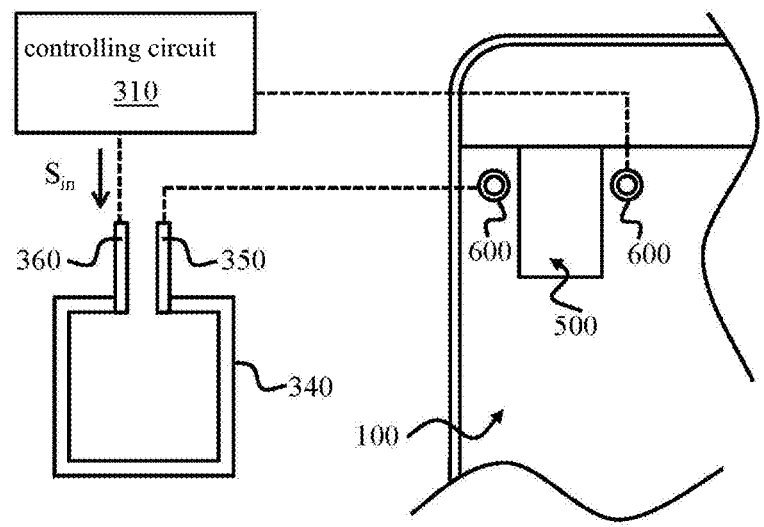
FIG. 8 is a schematic diagram of a second antenna according to some embodiments of the present invention

Please refer to FIG. 8, in some embodiments, the electronic device 10 further includes a second antenna 340 with a coupling point 350 and a feeding point 360. The coupling point 350 of the second antenna 340 is coupled to one of the two feeding parts 600, and the controlling circuit 310 is coupled to the feeding point 360 of the second antenna 340 and the other one of the two feeding parts 600. The second antenna 340 generates an auxiliary near field magnetic field (not shown) in response to the feeding signal $S_{in}$ to match the near field magnetic field $S_{out}$, and therefore, the second antenna 340 enhances the intensity of the near field magnetic field $S_{out}$ to improve the sensing performance of the electronic device 10. It should be particularly noted that the second antenna 340 is set in the electronic device 10 according to the position of the opening 500, and by placing the opening 500 and the second antenna 340 at different locations in the electronic device 10, the second antenna 340 is operated in series with the first antenna to enhance the intensity of the near field magnetic field $S_{out}$.

In some embodiments, the second antenna 340 is an antenna with near field communication function. The second antenna 340 is but not limited to a flexible printed circuit board (FPC) type, a laser direct structuring (LDS) or a plane spiral coil with a printed circuit board (PCB) type.

Figure 9:
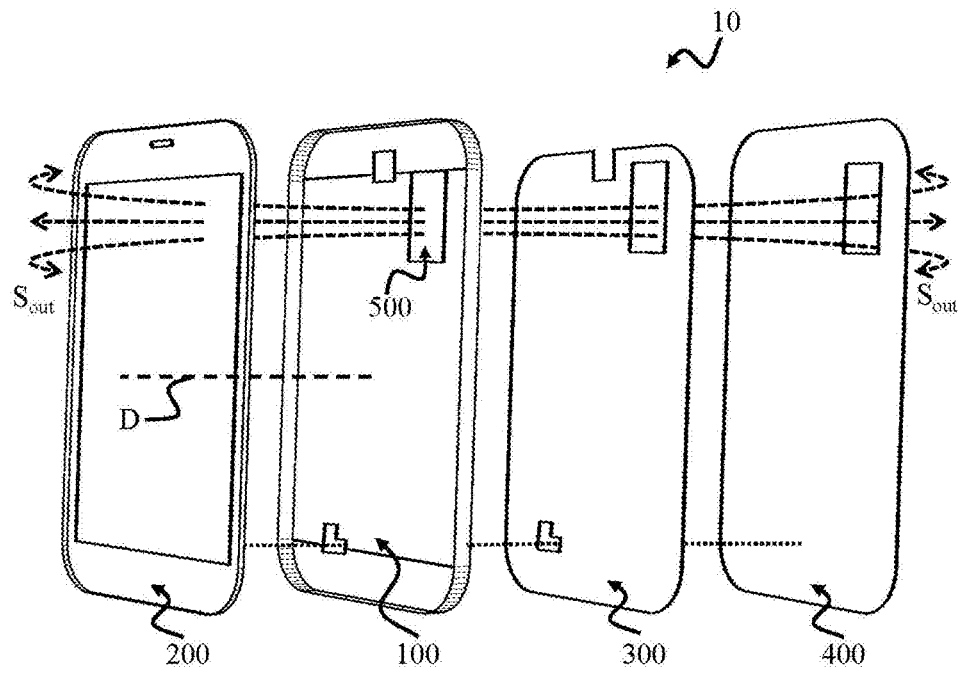
FIG. 9 is a schematic diagram of a near field magnetic field according to other embodiments of the present invention

Referring to FIG. 1 and FIG. 9, in some embodiments, the thickness of the electronic assembly 700 in the opening 500 on the normal line D is approximated to the thickness of the electronic device 10 on the normal line D, and therefore, the electronic device 10 does not overlap other conductive elements on the normal line D of the opening 500, so that the near field magnetic field $S_{out}$ generated by the feeding signal $S_{in}$ is not shielded by other conductive elements. Moreover, the electronic assembly 700 has only a small area of conductive structure, so that the electronic assembly 700 not easy to generate eddy current due to the near field magnetic field $S_{out}$. Thus, the electronic device 10 has the function of near field communication without adding a ferrite sheet to strengthen the near field magnetic field $S_{out}$. In some embodiments, the electronic assembly 700 is a camera module, a speaker module, or an earpiece module, but is not limited thereto.

In some embodiments, the near field magnetic field $S_{out}$ has a plurality of magnetic lines of force L, wherein the magnetic field line L of the near field magnetic field $S_{out}$ passes through the panel 200 and the insulated backplane 400. Specifically, since the magnetic line L is not shielded by the large-area conductive element on the normal line D of the opening 500, Both the positive side and the negative side of the electronic device 10 can provide effective near field communication to enhance the sensing feel, and enhance the design flexibility of the fingerprint identification element of the electronic device 10.

Figure 10:
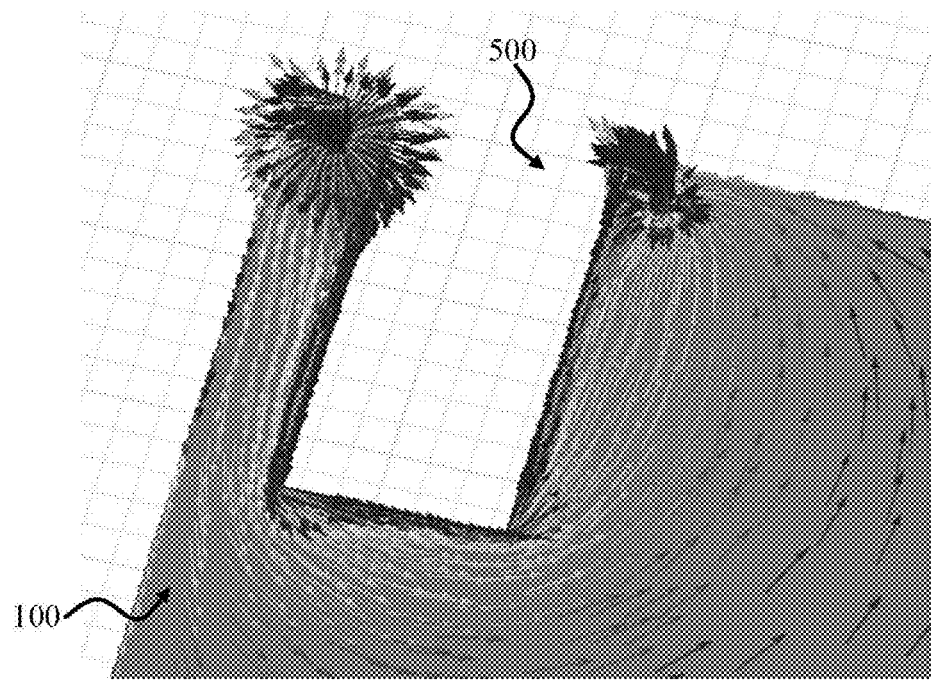
FIG. 10 is a test chart of the feeding signal according to some embodiments of the present invention

Referring to FIG. 10, in some embodiments, the feeding signal $S_{in}$ is input from one of the two feeding parts 600, and then the feeding signal $S_{in}$ that flowing along the edge of the opening 500 is output from the other one of the two feeding parts 600. The signal density distribution of the feeding signal $S_{in}$ in the conductive plate 100 is as shown in FIG. 10. The arrow symbol represents the feeding signal $S_{in}$. The more the arrow symbol is, the stronger the signal of the feeding signal $S_{in}$ is. On the contrary, the less the arrow symbol is, the weaker the signal of the feeding signal $S_{in}$ is.

Figure 11:
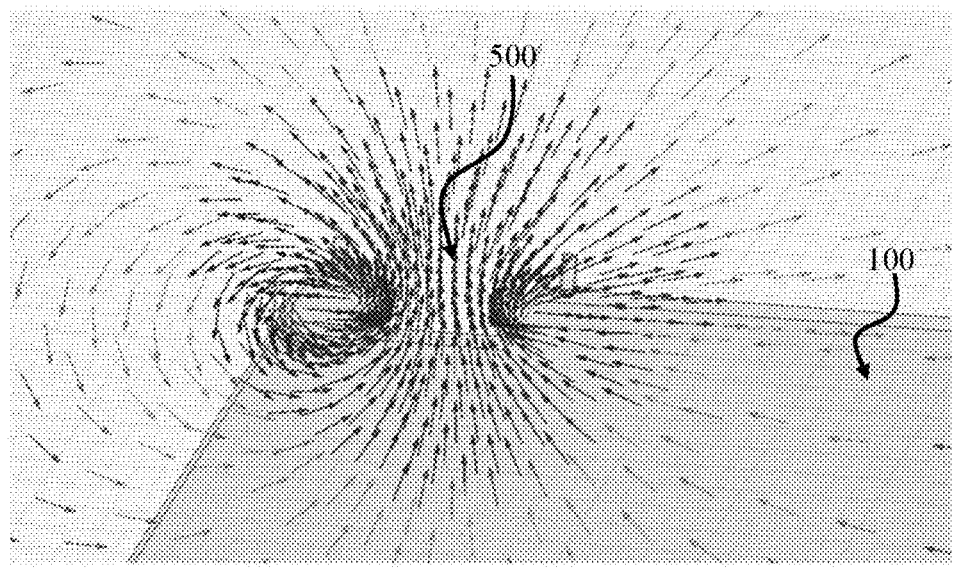
FIG. 11 is a test chart of the near field magnetic field according to some embodiments of the present invention

Referring to FIG. 11, in some embodiments, the signal of the near field magnetic field $S_{out}$ is generated on both sides of the conductive plate 100 by when the near field magnetic field $S_{out}$ is generated in the opening 500. The signal density distribution of the near field magnetic field $S_{out}$ is as shown in FIG. 11. The arrow symbol represents the near field magnetic field signal $S_{out}$. The more the arrow symbol is, the stronger the signal of the near field magnetic field signal $S_{out}$ is. On the contrary, the less the arrow symbol is, the weaker the signal of the near field magnetic field signal $S_{out}$ is.

Figure 12:
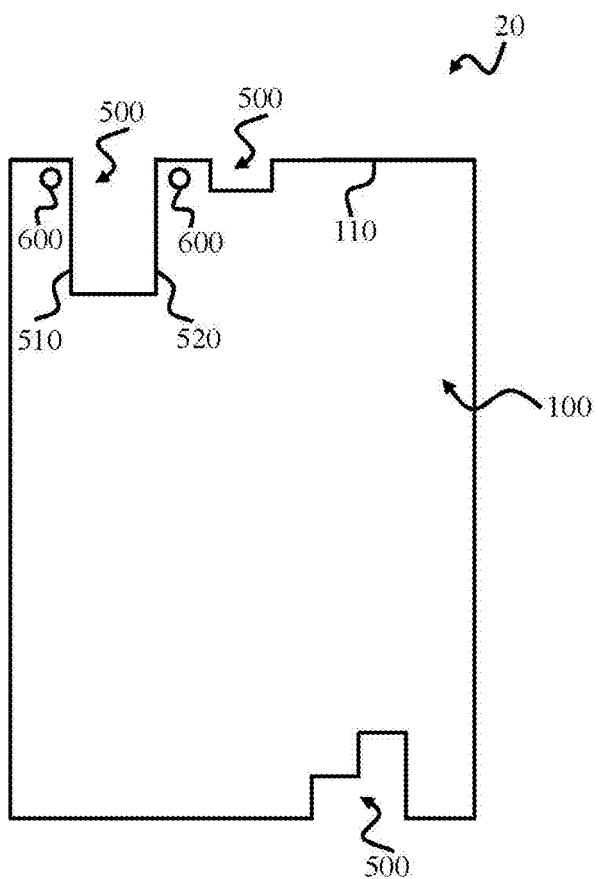
FIG. 12 is a schematic diagram of a near field communication antenna according to some embodiments of the present invention.

Referring to FIG. 12, in some embodiments, the near field communication antenna 20 includes the conductive plate 100, the opening 500, and two feeding parts 600. The opening 500 is disposed on the side 110 of the conductive plate 100. The opening 500 has the first side 510 and the second side 520 opposite to each other, wherein the first side 510 and the second side 520 are connected to the side 110 of the conductive plate 100. Two feeding parts 600 are respectively disposed on the first side 510 and the second side 520. In an embodiment, two feeding parts 600 receives the feeding signal $S_{in}$, wherein the feeding signal $S_{in}$ is transmitted from the first side 510 of the opening 500 to the second side 520 of the opening 500 and generates the near field magnetic field $S_{out}$.

In summary, the function of near field communication is achieved through the opening 500 of the conductive plate 100 of the electronic device 10 in the disclosure. Since the conductive plate 100 in the electronic device 10 includes the opening 500 that configured to set the electronic assembly 700. By setting the two feeding parts 600 on the first side 510 and the second side 520 of the opening 500, and the opening 500 only overlaps the electronic assembly 700 with a small area of conductive structure on the normal line D, the near field communication function is achieved without occupying extra internal space of the electronic device, thereby solving the problem that the conventional large-size antenna is too large. In some embodiments, the electronic device 10 of the disclosure is connected to another antenna with near field communication function to enhance the strength of the near field magnetic field $S_{out}$.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:
1. An electronic device, comprising:
   a conductive plate;
   an opening, disposed at a side of the conductive plate and having a first side and a second side opposite to each other, wherein the first side and the second side are connected with the side of the conductive plate;

two feeding parts, respectively disposed on the first side and the second side of the opening, to receive a feeding signal, wherein the feeding signal is transmitted along the first side of the opening to the second side of the opening and generates a near field magnetic field;

an electronic assembly, located in the opening;

a conductive frame, connected with the conductive plate; and an insulation plate, connected with the conductive frame and the conductive plate, wherein the insulation plate is connected with the side with the opening.

2. The electronic device according to claim 1, further comprising a second antenna, the second antenna is coupled to one of the two feeding parts.

3. The electronic device according to claim 1, further comprising a controlling circuit, coupled to the two feeding parts, and outputting the feeding signal.

4. The electronic device according to claim 3, wherein the feeding parts are fixing slots, the controlling circuit is connected to the two fixing slots by two fixing elements, and the feeding signal is transmitted to the fixing slots via the fixing elements.

5. The electronic device according to claim 3, wherein each of the feeding parts is a conductive contact, and the connecting circuit is connected to the two conductive contacts through two elastic plates, and the feeding signal is transmitted to the conductive contacts via the elastic plates.

6. The electronic device according to claim 1, further comprising a panel and an insulated backplane, the panel and the insulated backplane are respectively located on a normal line of the conductive plate, and the conductive plate is located between the panel and the insulated backplane, wherein the magnetic field lines of the near field magnetic field pass through the panel and the insulated backplane.

7. The electronic device according to claim 1, wherein the two feeding parts are adjacent to the side of the conductive plate and respectively adjacent to the first side and the second side of the opening.

8. The electronic device according to claim 1, wherein the electronic assembly is a camera module, an earpiece module or a speaker module.

9. An electronic device, comprising:

a conductive plate;

an opening, disposed at a side of the conductive plate, the opening having a first side and a second side opposite to each other, wherein the first side and the second side are connected with the side of the conductive plate;

two feeding parts, respectively disposed on the first side and the second side of the opening, to receive a feeding signal, wherein the feeding signal is transmitted along the first side of the opening to the second side of the opening and generates a near field magnetic field;

an electronic assembly, located in the opening; and a controlling circuit, coupled to the two feeding parts, and outputting the feeding signal;

wherein the feeding parts are fixing slots, the controlling circuit is connected to the two fixing slots by two fixing elements, and the feeding signal is transmitted to the fixing slots via the fixing elements.

10. An electronic device, comprising:

a conductive plate;

an opening, disposed at a side of the conductive plate and having a first side and a second side opposite to each other, wherein the first side and the second side are connected with the side of the conductive plate;

two feeding parts, respectively disposed on the first side and the second side of the opening, to receive a feeding signal, wherein the feeding signal is transmitted along the first side of the opening to the second side of the opening and generates a near field magnetic field;

an electronic assembly, located in the opening;

a panel; and an insulated backplane;

wherein the panel and the insulated backplane are respectively located on a normal line of the conductive plate, and the conductive plate is located between the panel and the insulated backplane, wherein the magnetic field lines of the near field magnetic field pass through the panel and the insulated backplane; and wherein the insulated backplane covers an exterior side of the conductive plate.

\* \* \* \* \*